(12) United States Patent
Kim

(10) Patent No.: US 8,102,431 B2
(45) Date of Patent: Jan. 24, 2012

(54) SYSTEM AND METHOD FOR REMOTE MANAGEMENT OF IMAGE PROCESSING DEVICE

(75) Inventor: Sung-Ju Kim, Seoul (KR)

(73) Assignee: GNST Co., Ltd (KR)

( * ) Notice: Subject to any disclaimer, the term of this patent is extended or adjusted under 35 U.S.C. 154(b) by 469 days.

(21) Appl. No.: 12/364,959

(22) Filed: Feb. 3, 2009

(65) Prior Publication Data

US 2010/0033586 A1 Feb. 11, 2010

(30) Foreign Application Priority Data

Feb. 4, 2008 (KR) ........................ 10-2008-0011143

(51) Int. Cl.
*H04N 5/232* (2006.01)
(52) U.S. Cl. .................................. 348/211.1; 348/222.1
(58) Field of Classification Search ............... 348/211.1, 348/211.3, 211.4, 222.1, 372
See application file for complete search history.

(56) References Cited

U.S. PATENT DOCUMENTS

| | | | |
|---|---|---|---|
| 6,208,379 B1 * | 3/2001 | Oya et al. ................... | 348/211.11 |
| 2004/0184110 A1 * | 9/2004 | Maei et al. ................... | 358/400 |
| 2007/0236734 A1 * | 10/2007 | Okamoto ..................... | 358/1.16 |
| 2008/0100873 A1 * | 5/2008 | Ohtsu ............................ | 358/403 |
| 2008/0201555 A1 * | 8/2008 | Ooshio .......................... | 712/29 |
| 2009/0064275 A1 * | 3/2009 | Eguchi et al. ................ | 726/2 |

FOREIGN PATENT DOCUMENTS

| | | | |
|---|---|---|---|
| JP | 03-296396 | | 12/1991 |
| JP | 06-054073 | | 2/1994 |
| JP | 11-039539 | | 2/1999 |
| JP | 2004288067 | * | 3/2003 |
| JP | 2003-099121 | | 4/2003 |
| JP | 2004-094831 | | 3/2004 |
| JP | 2005-309643 | | 11/2005 |
| JP | 2005-333222 | | 12/2005 |

(Continued)

OTHER PUBLICATIONS

Korean Office Action-Korean Patent Application No. 10-2008-0011143 issued Jul. 31, 2010, KR10-2003-0060853 and KR10-2007-0120649.

JP Office Action-Japanese Application No. 2009-013498 issued Nov. 9, 2010.

Decision of Grant-Korean Patent Application No. 10-2008-0011143 issued Nov. 2, 2010.

*Primary Examiner* — Gevell Selby
(74) *Attorney, Agent, or Firm* — Cantor Colburn LLP

(57) ABSTRACT

A remote management system includes a plurality of image processing devices which each detect their own first state information according to a power state transition or an operation, provide the first state information via a network, and respond to polling; and a management server which manages the first state information provided by each image processing device and second state information obtained from a response to polling, and manages a history of each image processing device based on the first state information and the second state information. The remote management system can remotely collect and manage operation state, error information that can cause a malfunction, error information generated by abnormal operation as well as malfunction of individual image processing devices and can collect/manage state information such as image processing device internal operation state information, image processing device malfunction, network connection failure, and software error.

19 Claims, 13 Drawing Sheets

FOREIGN PATENT DOCUMENTS

| | | |
|---|---|---|
| JP | 2006-201879 | 8/2006 |
| JP | 2007-201652 | 8/2007 |
| JP | 2007-251697 | 9/2007 |
| JP | 2007-259301 | 10/2007 |
| KR | 10-1999-0040706 | 6/1999 |
| KR | 10-2003-0060853 | 7/2003 |
| KR | 10-2005-0122380 | 12/2005 |
| KR | 10-2007-0120649 | 12/2007 |

* cited by examiner

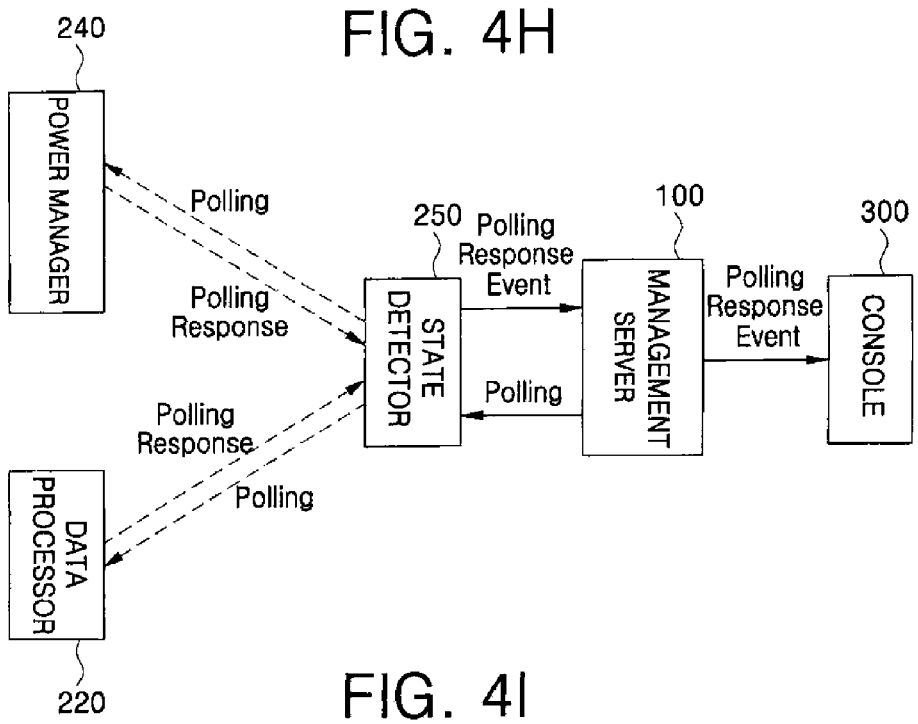
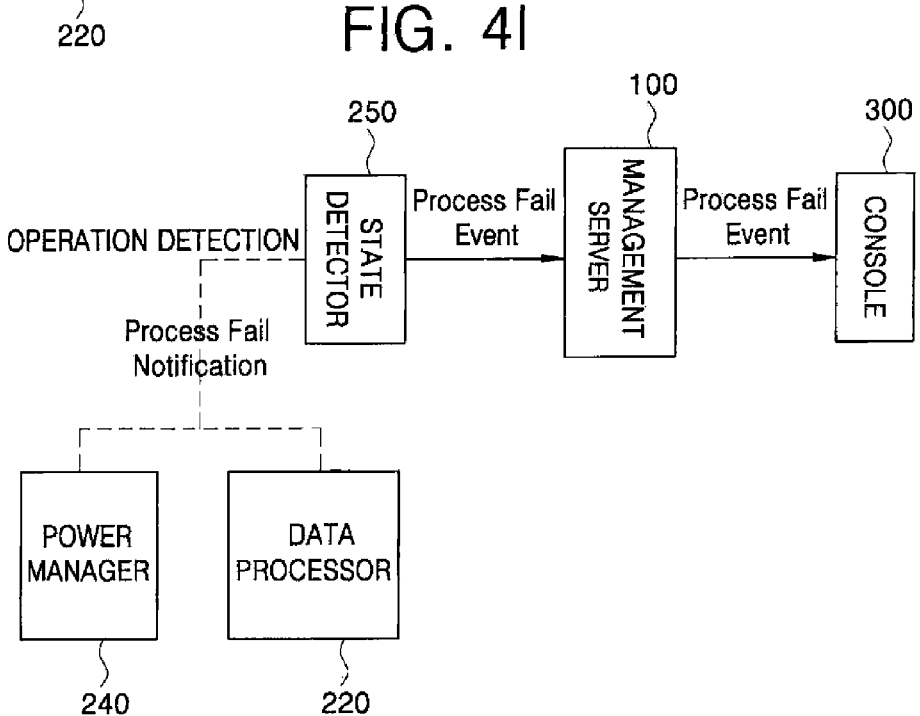

SYSTEM AND METHOD FOR REMOTE MANAGEMENT OF IMAGE PROCESSING DEVICE

CROSS-REFERENCE TO RELATED APPLICATION

This application claims priority to and the benefit of Korean Patent Application No. 2008-11143, filed on Feb. 4, 2008, the disclosure of which is incorporated herein by reference in its entirety.

BACKGROUND

1. Field of the Invention

The present invention relates to a system and method for remote management of image processing devices. More particularly, the present invention relates to a system and method for remote management of image processing devices in which information about operation states, errors that can cause malfunction, errors generated by abnormal operation, as well as malfunction of individual image processing devices can be remotely collected/managed. In the system and method for remote management of image processing devices, each image processing device detects its own operation state or state information according to a power state transition and transmits the result to a management server which collects image processing device state information based on polling, so that state information such as image processing device internal operation state information, image processing device malfunction, network connection failure, and software error can also be collected/managed.

2. Discussion of Related Art

Today, various image processing devices that take an image and process image information, such as Closed-Circuit Television (CCTV), Digital Video Recorders (DVRs), and digital cameras, are widely employed in various fields.

For example, image processing devices are installed in banks, offices or other areas that are vulnerable to crime to monitor for intruders and criminal activity. The goal is to prevent illegal activity in advance and to store images so that intruders and criminals can be identified later.

According to the way in which image processing devices are currently managed, an operator is assigned to each area in which an image processing device is installed, and the operators check for malfunction when image information stops being received from their image processing device.

In this method of having an operator directly manage each area, any one operator is only capable of checking a limited area, and thus an image processing device management range is restricted to a certain zone or a certain image processing device.

Also, since an operator cannot immediately cope with malfunction of an image processing device, in the event of malfunction, the device's crime deterring effect ceases for as long as it takes to carry out repairs.

In addition, since an operator should be assigned to each area in which an image processing device is installed, management is inefficient and operators lack expertise at checking and repairing malfunctions. Thus, precautionary and recovery measures are generally inefficient.

For these reasons, there is need for a system for rapidly coping with malfunction and increasing monitoring efficiency by having a specialized operator at a central office centrally monitor operation states of image processing devices distributed and installed in different areas.

Currently, a method for managing an image processing device connected via a network (the Internet) has been developed, but it only monitors an operation state (ON/OFF) of an image processing device.

A conventional image processing device management method is a method for monitoring an operation state of each image processing device through a separate management console. The management cost is high because a different operator must be paid to monitor the operation state of each image processing device. And, if an operator leaves his/her seat for whatever reason, the operation state of the image processing device cannot be monitored during that time.

Therefore, there is need for a management method in which a database of information such as an operation state (ON/OFF), a driving state (an operation state of software) and a storing state of image information is collected and compiled so that an operator can determine the causes of malfunctions of image processing devices installed in different areas in advance and rapidly cope with the malfunctions.

SUMMARY OF THE INVENTION

The present invention provides a system and method for remote management of image processing devices in which a plurality of image processing devices respectively installed in different areas are remotely managed via a network.

The present invention also provides a system and method for remote management of image processing devices in which error information that can cause malfunction and error information generated by abnormal operation, as well as an operation state of each image processing device, are collected and managed.

The present invention also provides a system and method for remote management of image processing devices in which each image processing device detects its own operation state or state information according to a power state transition and transmits the result to a management server, which collects image processing device state information based on polling, so that state information such as image processing device internal operation state information, image processing device malfunction, network connection failure and software error is collected and managed.

The present invention also provides a system and method for remote management of image processing devices in which history based on state information of each image processing device is statistically processed and provided to an operator so that the operator can identify and readily manage errors or defects in image processing devices in advance.

The present invention also provides a system and method for remote management of image processing devices in which error information and operation state are reported not only to an operator managing image processing devices or a user using image processing devices through a console, but also to an operator/user who has left his/her seat, through mobile phone text messaging (for example, Short Message Service (SMS)) or e-mail in real time.

According to an aspect of the present invention, there is provided a system for remote management of image processing devices, the system including: a plurality of image processing devices which each detect their own first state information according to a power state transition or an operation state, provide the first state information via a network, and respond to polling; and a management server which manages the first state information provided from each image processing device and second state information obtained from a polling response, and manages a history of each image processing device based on the first state information and the second state information.

The remote management system may further include a plurality of consoles which each output state information in the form of a pop-up window or a warning sound, wherein the management server provides the first state information provided from each image processing device to each console in real time and provides the second state information to each console when the second state information is obtained.

The management server may transmit the first state information and the second state information on a text message to a mobile phone number or a designed e-mail address.

The first state information may include at least one of power-on information, power-off information or reboot information according to a power state transition, image data loss information, image data storage state error information or storage failure information, and operating processor error information.

The second state information may include at least one of device error information of each image processing device, software error information and network connection failure information.

Each image processing device may transmit the first state information using a TCP/UDP-based socket communication method.

Each image processing device may include: a power manager which manages a power state of the image processing device and provides power-on information, power-off information or reboot information according to the power state transition; an image acquisition unit which acquires an image and provides an image signal; a data storage which stores image data corresponding to the image signal; a data processor which digitally processes the image signal provided from the image acquisition unit, detects data loss and a storage state while storing the image data in the data storage, and provides image data loss information or storage state error information; and a state detector which detects a data storage state of the data storage and transmits storage failure information to the management server, detects an operation state of a processor and transmits processor error information to the management server, provides the information provided from the power manager and the data processor to the management server, and transmits a response to polling of the management server and software error information obtained by polling each processor to the management server.

The state detector may detect a storage failure state when the amount of data stored in the data storage does not increase for a predetermined time or the size of a file storing image data does not increase for a predetermined time, poll each processor operating software and transmit the software error information to the management server when a processor responds with abnormal information or there is no polling response, and detect a processor error when operation of a processor included in a processor list of the image processing device is stopped. The image processing device may generate a thread when the state information is generated or polling is performed.

The management server may include: a state information processor which receives the first state information from the image processor and obtains the second state information from a polling response; a database which stores the first state information and the second state information of each image processing device; a state information provider which transmits the first state information and the second state information received from the state information processor to a console in real time or transmits the first state information and the second state information using a text message or an e-mail; and a history manager which manages history information based on the first and second state information of each image processing device stored in the database.

The state information processor may include: a state information receiver which receives the first state information from each image processor and transmits the first state information through the state information provider in real time; and a polling processor which obtains the second state information which is one of device error information, software error information or network connection failure information based on the polling response and transmits the second state information through the state information provider in real time.

The history manager may manage the history information according to identification information of the image processing device, type of state information, occurrence time or group, and search for and provide history information according to an operator's request.

According to another aspect of the present invention, there is provided an image processing device which acquires and stores an image, the device including: a power manager which supplies an operating voltage to the image processing device and provides power-on information, power-off information or reboot information according to a power state transition; an image acquisition unit which acquires an image and provides an image signal; a data storage which is realized by a hard disk drive (HDD) and stores image data corresponding to the image signal; a data processor which digitally processes the image signal provided from the image acquisition unit and provides image data loss information or storage state error information when data loss or a storage error occurs in processing the image signal; and a state manager which generates storage failure state information when the amount of data stored in the data storage does not increase for a predetermined time, polls each processor operating software and generates software error information when a processor responds with abnormal information or there is no polling response, generates processor error information when a processor's operation is stopped, and transmits the information provided from the data processor and the power manager and the generated information to a management server.

According to still another aspect of the present invention, there is provided a management server which manages an image processing device, the management server including: a state information processor which periodically polls the image processing device, and when there is no polling response, detects malfunction of the image processing device, an operation error or network connection failure and generates device error information, network connection failure information or software error information; a database which stores the device error information, network connection failure information or software error information generated by the state information processor; a state information provider which transmits the device error information, network connection failure information software error information to at least one console in real time or transmits the device error information, network connection failure information or software error information using a text message or an e-mail; and a history manager which manages history information based on the device error information, network connection failure information or software error information stored in the database.

According to yet another aspect of the present invention, there is provided a method for remote management of image processing devices, including: at a management server, accessing and registering a plurality of image processing devices via a network; at each image processing device, transmitting first state information, detected by the image processing device, to the management server; at the management server, generating second state information based on a response to periodic polling; at the management server, providing the first state information and the second state information to an operator console in real time; at the console, outputting the first state information and the second state information; and at the management server, managing history information based on the first state information and the second state information The transmitting detected first state information to the management server may include generating power-on information, power-off information or reboot information according a power state transition of each image processing device; detecting a storage failure state when the amount of stored data does not increase for a predetermined time or the size of a file storing image data does not increase for a predetermined time and generating storage failure state information; polling each processor operating software and generating software error information when a processor responds with abnormal information or there is no polling response; and detecting a processor error when operation of a processor included in a processor list of the image processing device is stopped and generating processor error state information.

The generating second state information may include periodically polling the image processing device, and when there is no polling response, determining malfunction of the image processing device, an operation error or network connection failure and generating device error information, network connection failure information or software error information.

The providing the first state information and the second state information to an operator console in real time may include transmitting the first state information and the second state information to the operator console or transmitting the first state information and the second state information using a text message based on a set mobile phone number or an e-mail.

The managing history information may include managing the first and second state information according to identification information of an image processing device, type of state information, occurrence time, and group; and when there is a request from an operator, searching for history information matching the request or statistically processing and providing history information.

At a management server, the accessing and registering a plurality of image processing devices via a network includes: when there is a registration list of registered image processing devices, accessing a corresponding image processing device based on registered access information; when there is access information manually input by an operator, accessing an image processing device based on corresponding access information; when a registration request message is received from an image processing device via a network, accessing a corresponding image processing device by extracting access information from the registration request message; and when an automatic search is requested by an operator, accessing the corresponding image processing device by extracting access information from an access request message received after broadcasting an accessible message via a network.

At a management server, the accessing and registering a plurality of image processing devices via a network may include when the image processing device operates to receive an accessible message, automatically generating an access request message including access information and transmitting the access request message to the management server; and when the image processing device is set to a registration mode, automatically generating an access request message including access information of the image processing device based on access information of a set management and transmitting the access request message to the management server.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 4A to 4I are flow diagrams illustrating a procedure in which state information of an image processing device is transmitted to a management server according to an exemplary embodiment of the present invention;

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
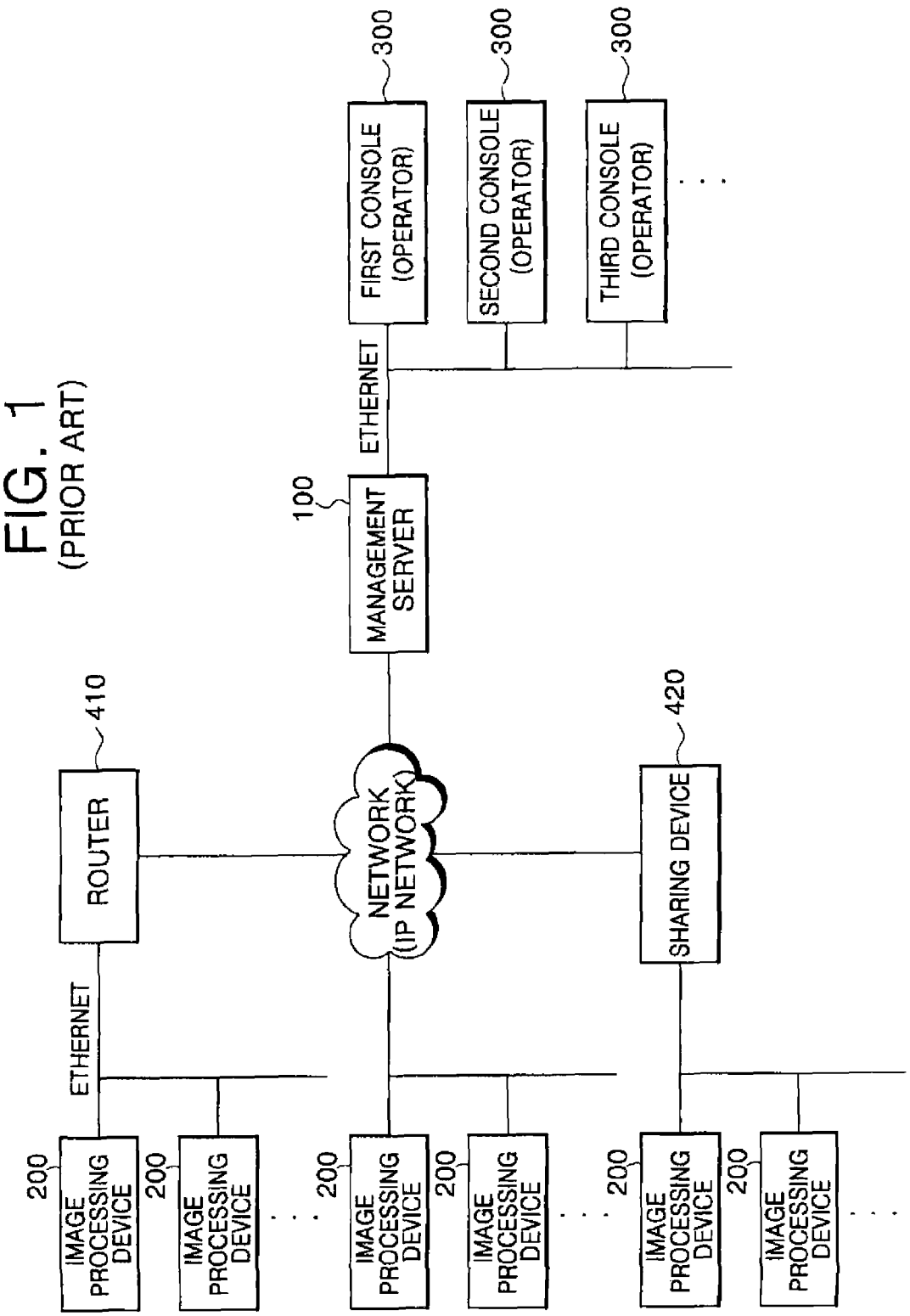
FIG. 1 is a schematic diagram illustrating a system for remote management of image processing devices according to an exemplary embodiment of the present invention.

FIG. 1 is a schematic network diagram illustrating a system for remote management of image processing devices according to an exemplary embodiment of the present invention Referring to FIG. 1, a plurality of image processing devices 200 which are installed at predetermined areas are connected to a management server 100 via a network (IP network), and the management server 100 is connected to a plurality of consoles 300 via a network (for example, Ethernet).

The image processing device 200 is connected to a router 410 to be connected to the management server 100 via the Ethernet or is connected to the management server 100 through a sharing device (420).

The management server 100 assigns a MAC address or discrete identification (ID) information to each image processing device 200 which is connected thereto via a network in order to identify each image processing device 200, and is connected to a corresponding image processing device 200 based on access information such as an IP address, a MAC address and device identification information (for example, a model name or a device serial number).

For example, the management server 100 can manage each image processing device 200 connected thereto via a network according to a MAC address, and manages operation state information and error information (hereinafter, collectively referred to as "state information") according to an event (occurrence of a certain situation (trap)) with respect to the image processing device 200 for each MAC address.

The reason that the management server 100 uses a MAC address to identify each image process device 200 is because if a plurality of image processing devices 200 are connected to a public network via a private network, the image processing devices 200 belonging to the private network have the same public IP address, and thus an IP address is indistinct. For this reason, a MAC address which is the only one in a network is preferably used to identify each image processing device 200.

The management server 100 collects and manages state information of each image processing device 200 connected thereto via a network, and provides collected state information to the console 300 in real time so that an operator (or user) can check it.

At this time, the management server 100 can provide state information to other key operators not accessing the management server 100 as well as to an operator who is monitoring the state of each image processing device 200. That is, the management server 100 can transmit state information to the set consol, transmit a text message (for example, a short message service (SMS) message) including state information to a mobile phone number or transmit an e-mail including state information to a set e-mail address.

The console 300 outputs state information provided from the management server 100 in real time so that an operator (or user) can recognize it. At this time, the console 300 can output state information in the form of a warning pop-up window or a warning sound.

As a method employed by the management server 100 to collect state information of each image processing device 200, a method in which each image processing device 200 inspects its own operation state using a software method and transmits state information to the management server 100, or a method in which the management server 100 periodically requests and receives state information of each image processing device 200, can be adopted.

That is, state information collected by the management server 100 can be classified into state information detected by the image processing device 200 itself or state information collected by the management server 100 by monitoring the state of the image processing device 200.

State information of the image processing device 200 managed by the management server 100 can include state information which the image processing device 200 detects using software operated therein such as power-on information, power-off information, reboot information, data loss information, storage state error information, storing device error information, processor error information, and state information that the management server 100 detects based on a response to periodic polling such as device error information, software error information, and network connection failure information.

State information collected by the management server 100 will be described later in detail.

Figure 2:
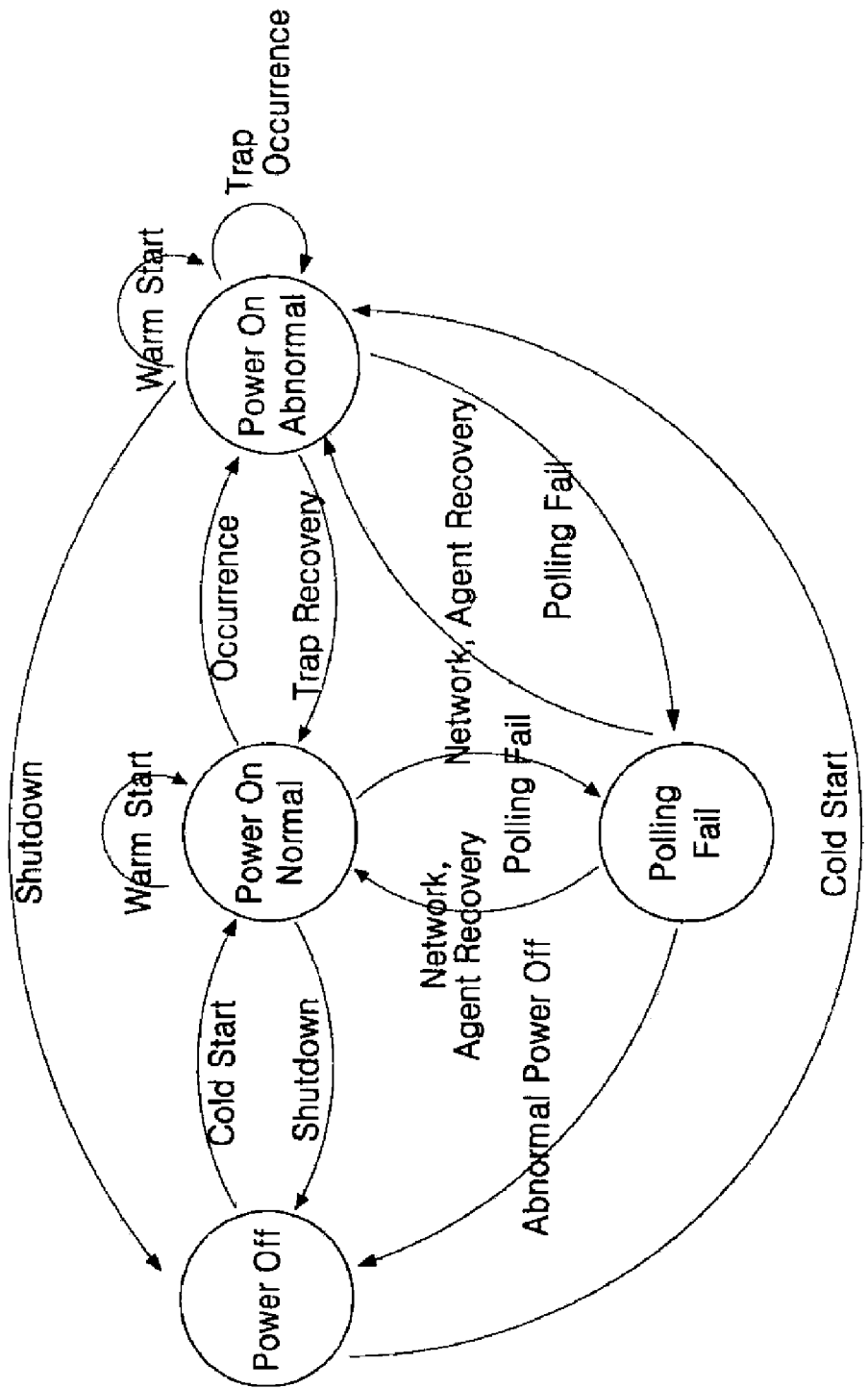
FIG. 2 is a state transition diagram illustrating state information generated in an image processing device according to an exemplary embodiment of the present invention.

FIG. 2 is a state transition diagram illustrating state information generated in an image processing device according to an exemplary embodiment of the present invention.

Referring to FIG. 2, a power state of the image processing device 200 can be classified into a power-off state "Power Off", a normal power-on state "Power On Normal" and an abnormal power-on state "Power On Abnormal".

Reboot information "Warm Stat" is generated when rebooting is normally performed in a normal power-off state, power-off information "Shutdown" is generated when it becomes a power-off state, and trap information "Trap" is generated when it becomes an abnormal power-on state.

Trap information can include state information which is detected when a certain situation (that is, event) occurs such as data loss(video loss) information, storage state error (HDD Fail) information, and storage capacity full (HDD Full) information.

In a transition from a power-off state to a normal power-on state or an abnormal power-on state, power-on information "Cold Start" is generated.

Meanwhile, when rebooting in an abnormal power-off state from an abnormal power-on state, reboot information is generated, and in a transition to a normal power-on state, trap recovery information is generated.

Trap recovery information can include a trap release in which an event is released, and an acknowledgement.

In a normal power-on state or an abnormal power-on state, if a response to polling requested by the management server 100 fails, the image processing device transitions to a polling fail state "Polling Fail", and if it returns to a normal power-on state or an abnormal power-on state, it becomes a polling recovery state.

If it transitions from a polling fail state to a power-off state, abnormal power-off information is generated.

That is, since a state in which there is no normal response to polling of the management server 100 can be recognized as a state in which a network is disconnected or software or a processor of the image processing device 200 is malfunctioning, when the image processing device 200 is fixed or a network is connected, recovery information is generated.

Figure 3:
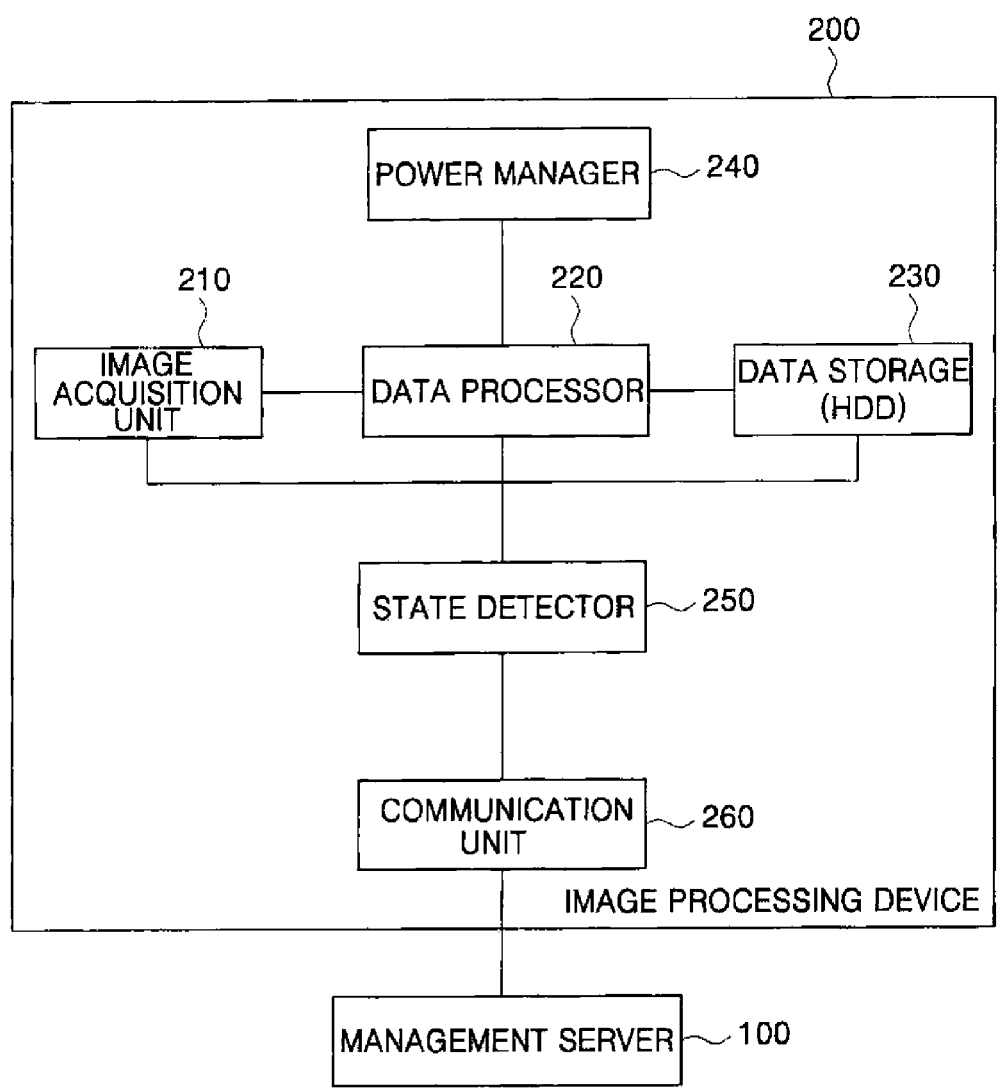
FIG. 3 is a block diagram illustrating an image processing device according to an exemplary embodiment of the present invention.

FIG. 3 is a block diagram illustrating the image processing device according to an exemplary embodiment of the present invention.

Referring to FIG. 3, the image processing device 200 of the present invention includes a power manager 240, an image acquisition unit 210, a data processor 220, a data storage 230, a state detector 250, and a communication unit 260.

The power manager 240, the data processor 220 and the state detector 250 of the image processing device 200 can be realized by processors, and application software is embedded in each processor to perform a corresponding function.

The power manager 240 supplies applied operation power to processors of the image processing device 200 to operate the image processing device 200, and provides state information (for example, power on, power off, and rebooting) to the state detector 250 according to a power state transition while managing a power state of the image processing device 200.

The image acquisition unit 210 acquires an image of an area in which the image processing device 200 is installed and provides an image signal.

The data processor 220 converts an analog image signal provided from the image acquisition unit 210 into a digital image signal and stores image data in the data storage 230.

Here, techniques for monitoring an image of a certain area are well-known to those skilled in the art and thus are not described in the detailed description of the present invention.

The data processor 220 provides state information such as data loss information and storage state error information to the state detector 250 when data loss or a storage state error occurs in the process of analyzing, compressing and storing an image signal.

The data storage 230 can be realized by a hard disk drive (HDD) and stores image data digitally processed by the data processor 220.

The communication unit 260 helps the image processing device 200 to access the management server 100 via a network to exchange data.

The state detector 250 transmits state information of the image processing device 200 to the management server 100 via the communication unit 260. The state detector 250 transmits a storage state of the image processing device 200, state information according to an operation of a processor, and state information according to a power state transition to the management server 100 by the embedded application software, and transmits a response to polling from the management server 100 and information requested by the management server 100.

The state detector 250 plays the role of an agent which provides state information of the image processing device 200 to the management server 100, communicates with the application software operated in the processor of the image processing device 200 using a socket method to check state information and then transmits the state information to the management server 100.

The power manager 240 and the data processor 220 of the image processing device 200 are realized by processors, operated by application software embedded therein, and provide state information such as power state information, data loss information, storage failure information, and storing device error information to the state detector 250. The state detector 250 detects state information such as storage state error information, device error information, software error information, and processor error information.

The power manager 240 and the data processor 220 which are processors use a TCP/IP-based socket communication method to perform data communication with the state detector 250.

Figure 4A:
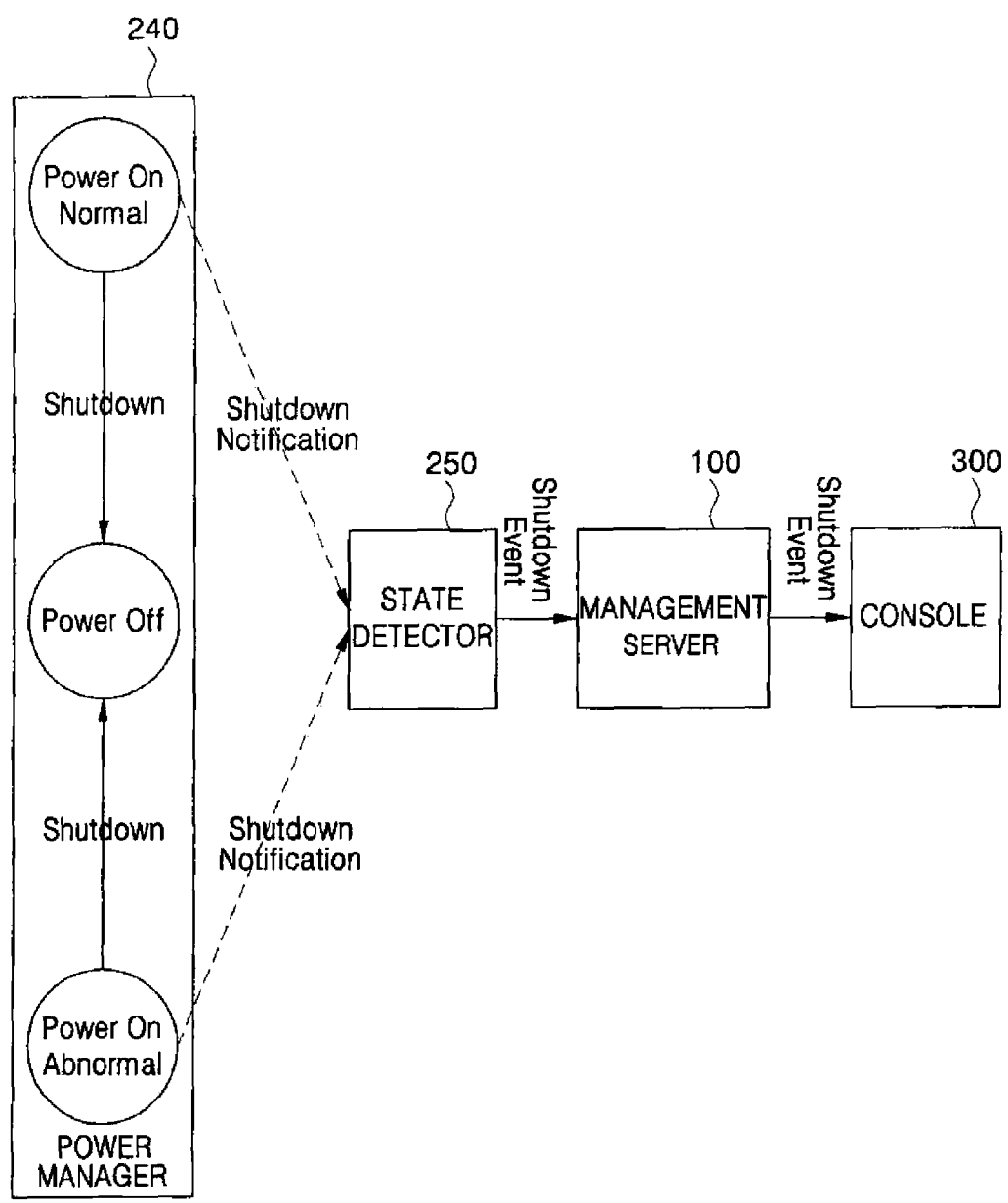
Figure 4B:
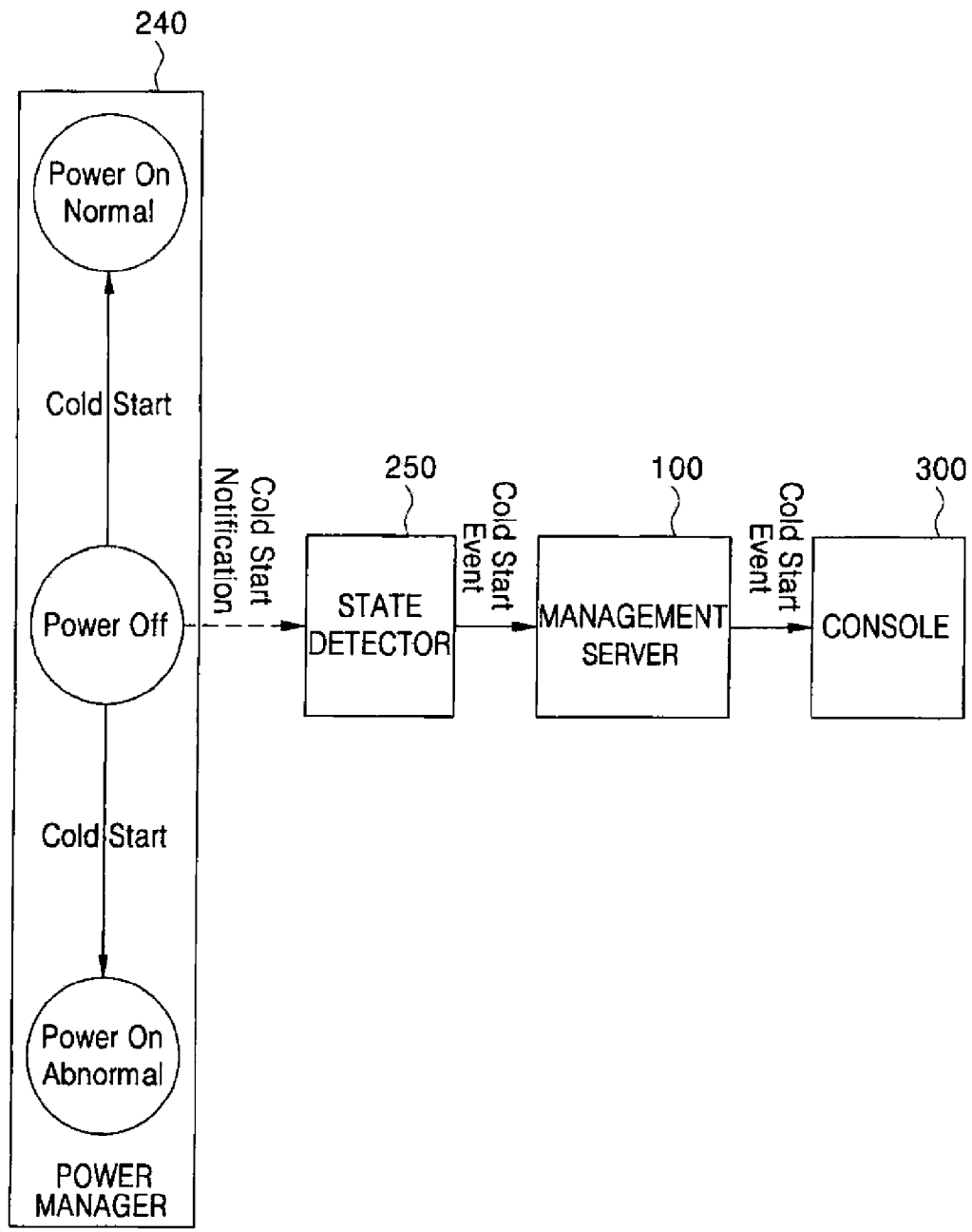
Figure 4C:
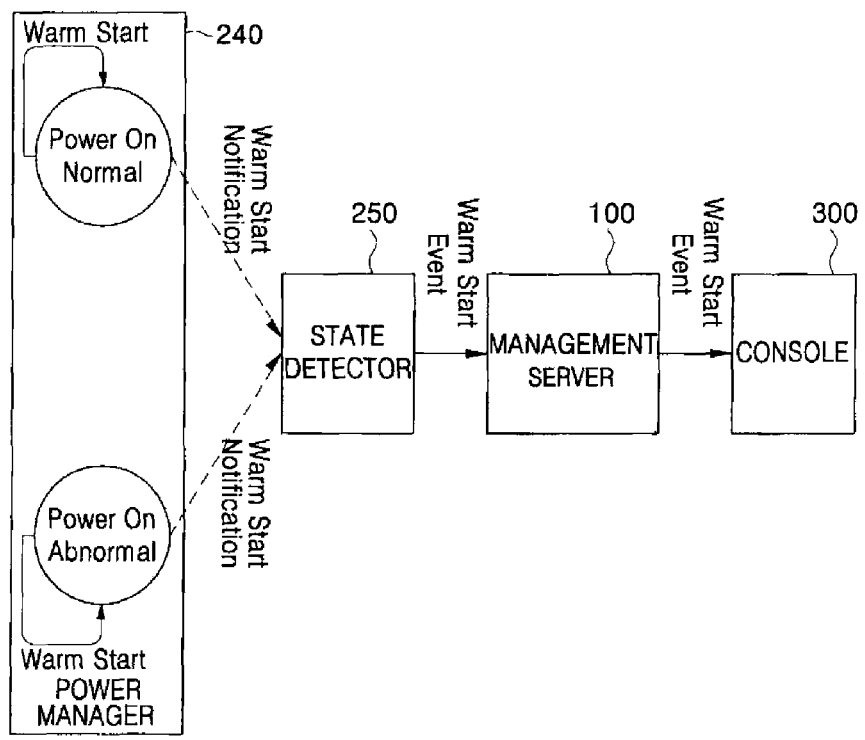

FIGS. 4A to 4I are flowcharts illustrating a procedure in which state information of the image processing device is transmitted to the management server according to an exemplary embodiment of the present invention FIGS. 4A to 4C are flow diagrams showing a procedure in which state information according to a power state of the image processing device 200 is transmitted. Referring to FIG. 4A, the power manager 240 notifies the state detector 250 as an agent of state information which is generated as a power state of the image processing device 200 transitions, such as reboot information "Warm Start," power-off information "Shutdown" and power-on information "Cold Start," the state detector 250 transmits state information (event) to the management server 100 via a network, and the management server 100 transmits state information to the console 300 in real time.

Figure 4D:
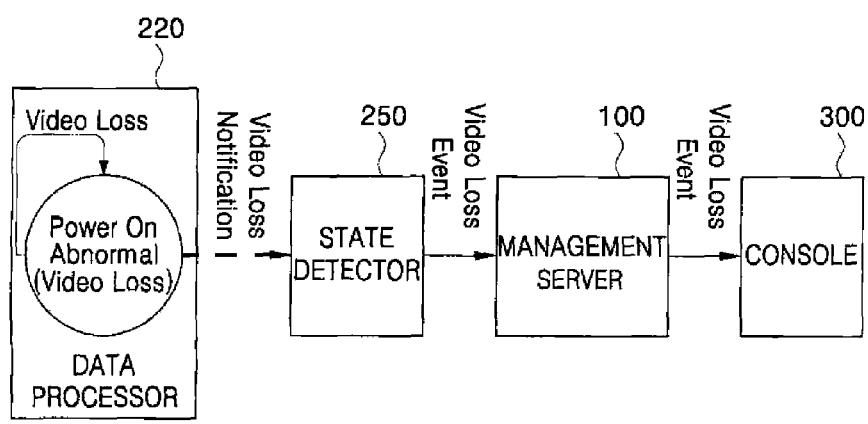
Figure 4E:
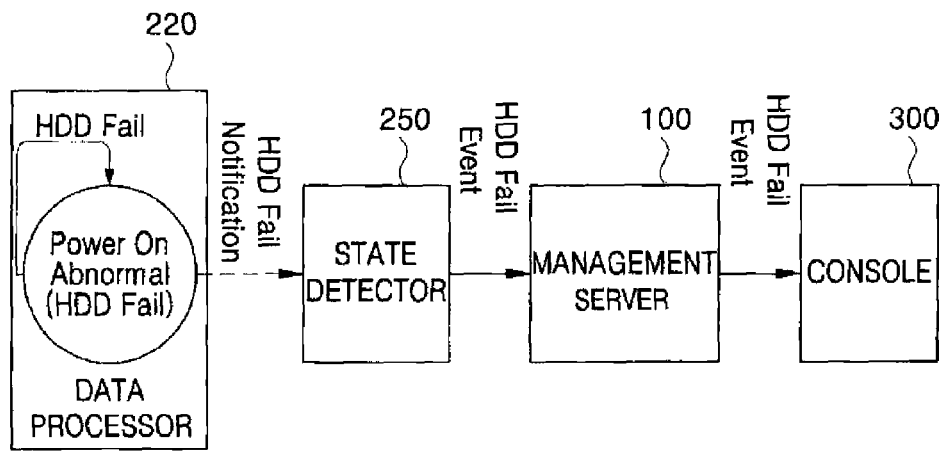

FIGS. 4D to 4E are flow diagrams showing a procedure in which state information generated when the image processing device processes image data is transmitted. The data processor 220 notifies the state detector 250 of state information such as data loss information and storage state error information when disconnection of an image signal or a data storing error occurs in the process of analyzing, compressing and storing an image signal, the signal detector 250 transmits state information to the management server 100, and the management server 100 transmits state information to the console 300 in real time.

For example, when the image processing device 200 is in an abnormal power-on state, since an image signal provided from the image acquisition unit 210 is not normally received and thus an image is interrupted, the data processor 220 notifies the state detector 250 of data loss information. Even if the image signal is normally received, since image data is not normally stored in the data storage 230, storage state error information is provided to the state detector 250.

Figure 4F:
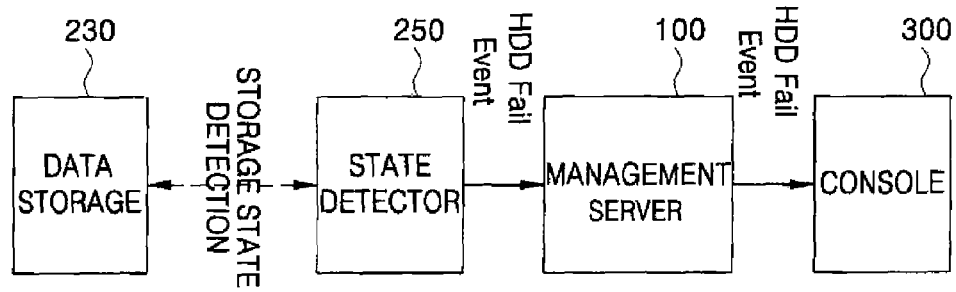

FIG. 4F is a flow diagram showing a procedure for transmitting storage failure information indicating that image data is not stored in the data storage 230. The state detector 250 detects a storage state in which image data is stored in the data storage 230, transmits storage failure information to the management server 100 when it becomes a state in which image data is not stored, and the management server transmits state information to the console 300 in real time.

At this time, when the amount of data stored in the data storage 230 does not increase for a predetermined time or the data amount of a file including image data does not increase for a predetermined time, the state detector 250 detects a storage failure state and transmits storage failure information to the management server 100.

Figure 4G:
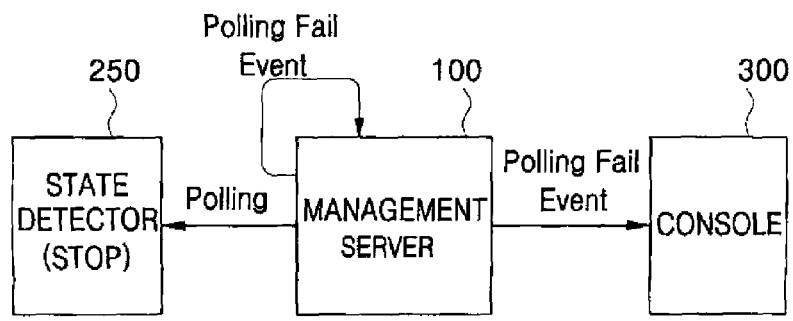

FIG. 4G is a flow diagram showing a procedure of device error information in a device error state in which the state detector does not operate. The management server 100 periodically polls the state detector 250 which is an agent. If the state detector 250 stops operating, it cannot reply to polling of the management server 100. Therefore, if there is no polling response for more than a predetermined number of times, the management server 100 determines there to be a device error and transmits notification to the console 300 in real time.

FIG. 4H shows a flow of software error information in a software error state of the image processing device. If the management server 100 periodically polls the state detector 250, the state detector 250 polls each processor operating software. When a processor responds with abnormal information or there is no polling response, software error information is transmitted to the management server 100 as a polling response. The management server 100 transmits state information to the console 300 in real time. That is, the state detector 250 detects software error (polling error) based on a polling result of each processor according to polling of the management server 100.

FIG. 4I shows a flow of processor error information in a processor error state of the image processing device. The state detector 250 which is an agent periodically detects an operation state of processors (for example, data processor 220 and the power manager 240) of the image processing device 200. If an operation of a certain processor is stopped, the state detector 250 transmits processor error information to the management server 100. At this time, processor error information includes identification information of a processor whose operation is stopped, and so an operator can check the processor in the error state among processors of the corresponding image processing device 200.

That is, the state detector 250 manages a list of processors operating in the image processing device 200 and detects a processor error when a processor in the list is not operating.

Figure 5:
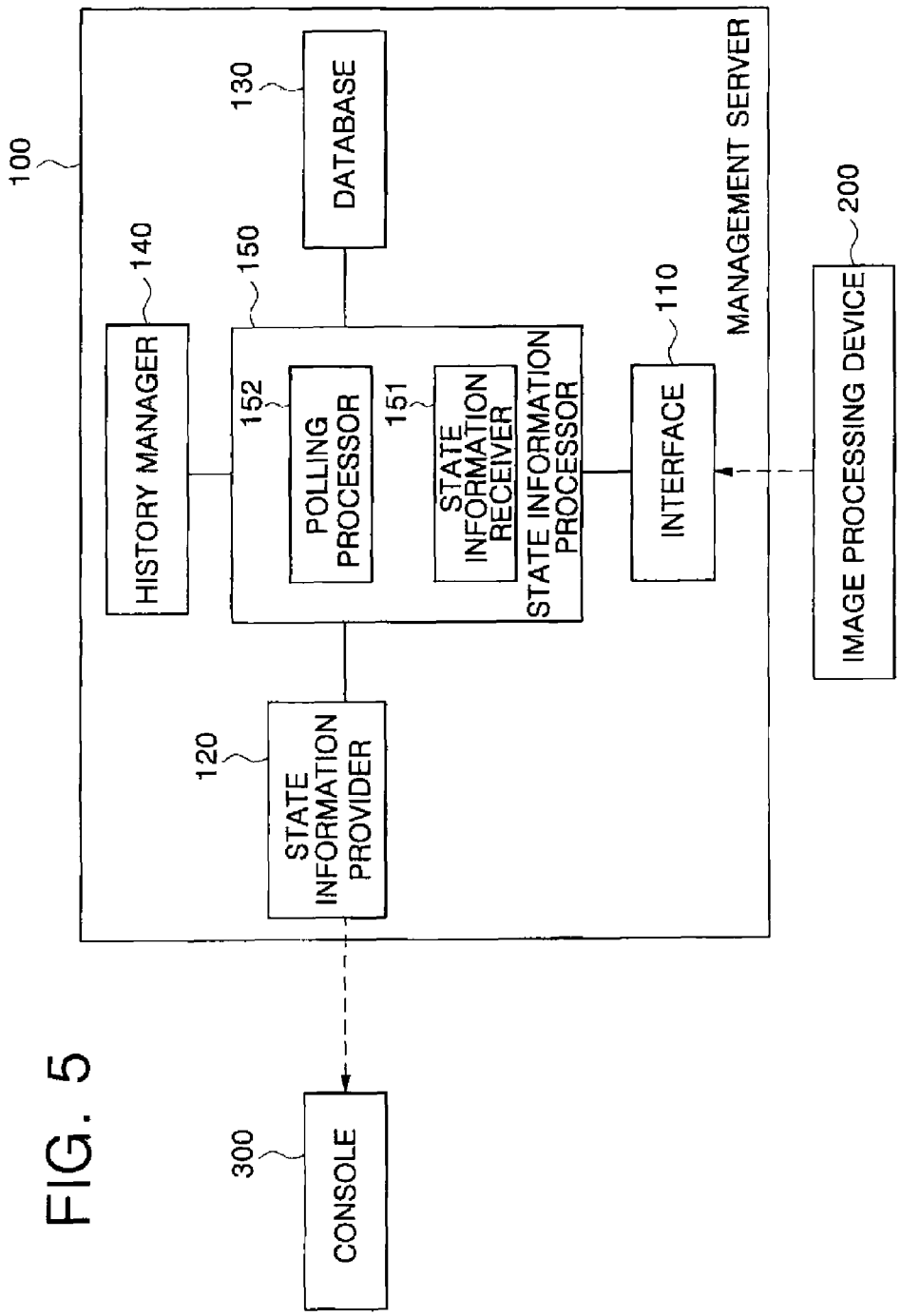
FIG. 5 is a block diagram illustrating a management server according to an exemplary embodiment of the present invention.

FIG. 5 is a block diagram illustrating the management server according to an exemplary embodiment of the present invention.

Referring to FIG. 5, the management server 100 of the present invention includes a history manager 140, a database 130, an interface 110, a state information provider 120, and a state information processor 150. The state information processor 150 includes a state information receiver 151 and a polling processor 152.

The database 130 stores state information for each of a plurality of image processing devices 200.

The interface 110 is connected to a plurality of image processing devices 200 via a network, receives state information and a polling response from the image processing devices 200, and performs an interfacing operation so that the management server 100 can poll the image processing devices 200.

The state information provider 120 provides state information collected from the image processing devices 200 to the console 300. The state information provider 120 transmits state information to a mobile phone number of an operator using a text message (for example, short message service (SMS)) or e-mails state information using e-mail address information.

At this time, the state information provider 120 can provide state information of the image processing device 200 to a plurality of operator consoles 300 connected thereto via a network.

The state information processor 150 provides state information received through the interface 110 to the console 300 through the state information provider 120 while storing state information for each image processing device 200 in the database 130.

The state information receiver 151 of the state information processor 150 stores state information received from a plurality of image processing devices 200 in the database 130 while transmitting state information to the console 300 through the state information provider 120.

The polling processor 152 periodically polls the image processing devices 200, checks whether a polling response is received from the image processing devices 200, acquires state information (for example, device error information, software error information, and network connection failure information), and stores acquired state information in the database 130 while providing state information to the console 300 through the state information provider 120.

The history manager 140 manages history information based on state information stored in the database 130 according to identification information of the image processing device 200, type of state information, occurrence time, and group of the image processing device 200. At an operator's request through the console 300, the history manager 140 searches for history information matching the request (for example, matching a requested type of state information) based on state information stored in the database 130, and provides the search result to the console 300 of an operator.

The history manager 140 manages history information in the form of a history file. At an operator's request history information, the history manager 140 loads a history file of the corresponding image processing device 200 to the console 300 and statistically processes history information of each image processing device 200 so that an operator can centrally manage the image processing devices 200. At this time, statistical processing is performed such that state information of each image processing device 200 is classified according to a condition (for example, time and model), so that an operator can check history information of each image processing device 200.

For example, when an operator has to visit an area in which the image processing device 200 is installed to directly manage the image processing device 200, history information and statistical information of the corresponding image processing device 200 are provided. Thus, an operator obtains information such as cause of error and part of the image processing device 200 requiring attention in advance to manage the image processing device 200.

Meanwhile, when an update on software embedded in the state detector 250 or processors (the power manager 240 and the data processor 220) installed in each image processing device 200 is required, the management server 100 checks a version of software embedded in the state detector 250 and the processors and remotely updates software if necessary.

Meanwhile, when the management server 100 initially operates, the state processor 150 can register the image processing device 200 connected thereto through a network by automatically searching or manually using identification information (MAC address) of the image processing device 200 input by an operator, and stores a registration list of the registered image processing devices 200 in the database 130.

Access information which is necessary for access via a network, such as an IP address, a MAC address and device identification information of the registered image processing device 200, is stored in the registration list.

Also, the image processing device 200 can transmit a registration request message when the management server 100 connected via a network is found.

The state information processor 150 can automatically access the image processing device 200 included in the registration list when the registration list is stored in the database 130.

Figure 6:
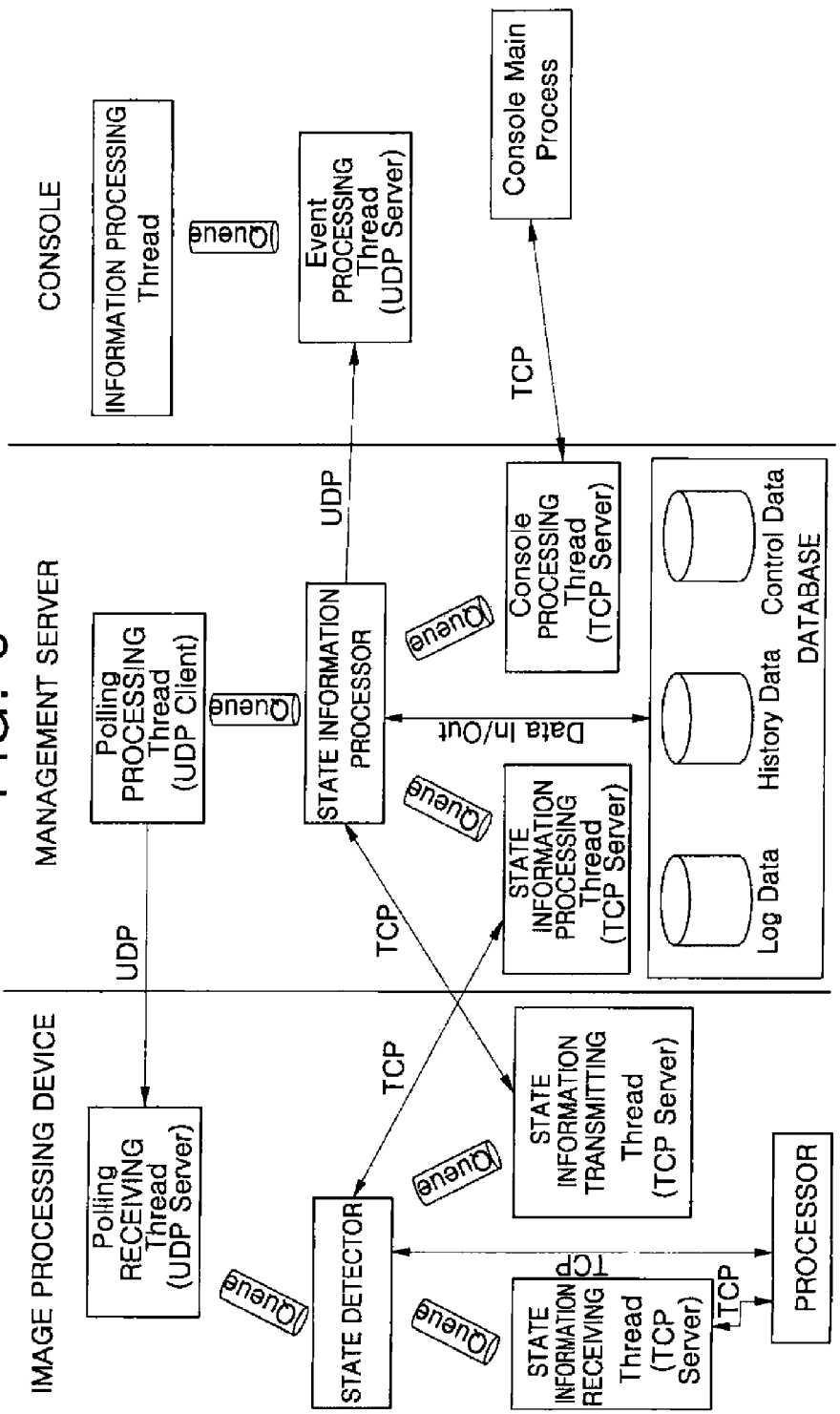
FIG. 6 is a diagram illustrating communications of a remote management system according to an exemplary embodiment of the present invention.

FIG. 6 shows communication of the remote management system according to an exemplary embodiment of the present invention.

Referring to FIG. 6, the remote management system of the present invention transmits state information using a TCP/UDP-based socket communication method, and produces a thread to process an event or polling when an event that generates state information occurs or when polling is performed.

The processor of the image processing device 200 (for example, the power manager 240 and the data processor 220) transmits state information to the state detector 250 through a state information receiving thread when an event that generates state information occurs.

If state information is received from a processor (for example, the power manager 240 and the data processor 220) or is detected while transmitting/receiving sate information or polling information to/from each thread through a queue, the state detector 250 transmits state information to the state information processor 150 of the management server 100 through a state information transmitting thread.

The state information processor 150 of the management server 100 periodically transmits polling information to a polling receiving thread of the image processing device 200 through a polling processing thread to check a device error state of the image processing device 200.

The state information processor 150 exchanges information with each thread through a queue and transmits state information to the console 300 in real time when state information is received by an event occurring in the image processing device 200 or when state information is generated by an event occurring by polling.

When state information is received through an event processing thread, the console 300 provides state information to an information processing thread so that the information processing thread can process state information. The information processing thread outputs state information in real time or transmits state information to an operator using a text message or an e-mail.

The state information processor 150 transmits state information to a main processor of the console 300 through a console 300 processing thread.

Figure 7:
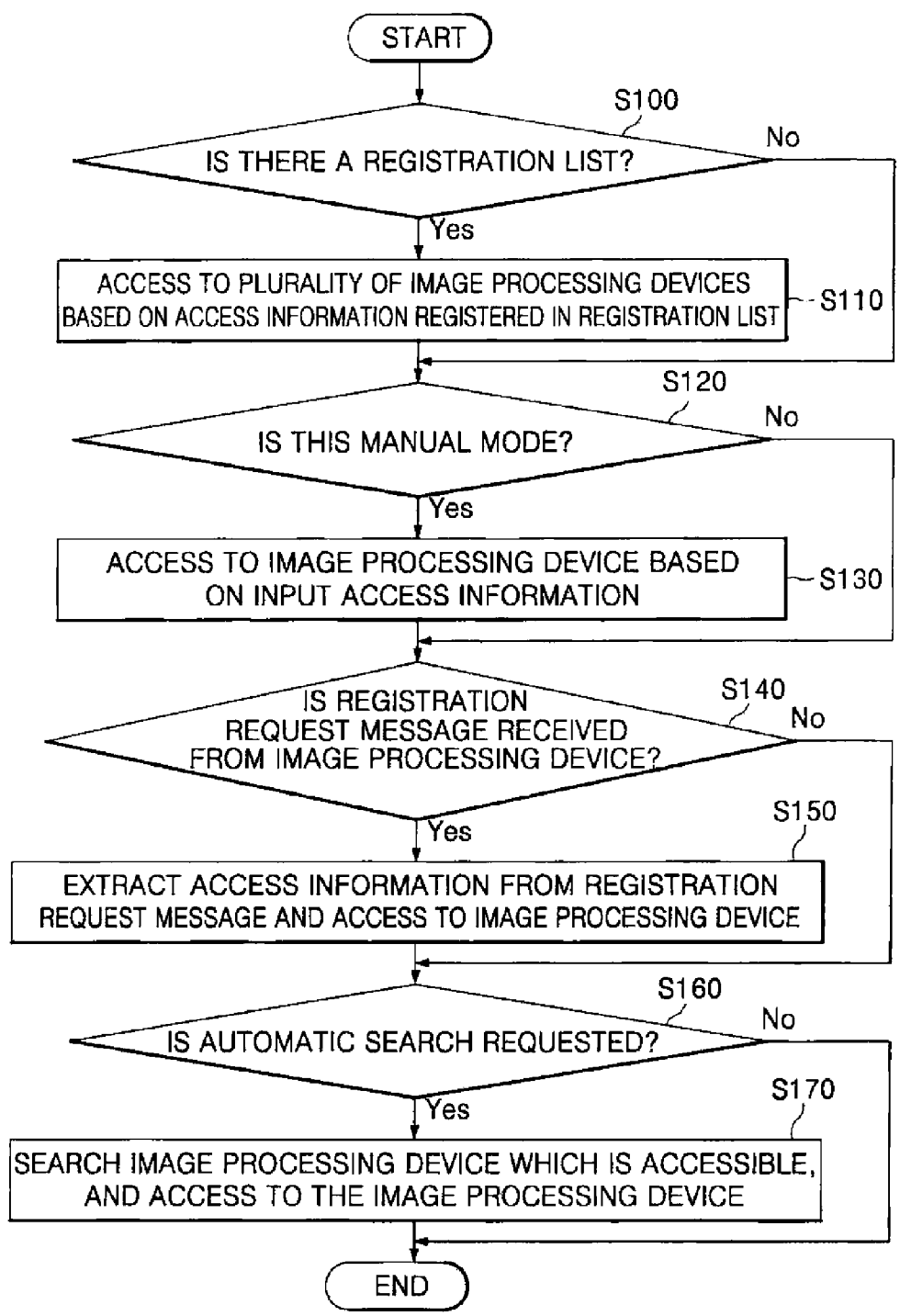
FIG. 7 is a flowchart illustrating a procedure in which a management server registers an image processing device according to an exemplary embodiment of the present invention.

FIG. 7 is a flowchart illustrating a procedure in which the management server registers the image processing device according to an exemplary embodiment of the present invention.

Referring to FIG. 7, when the management server 100 is operated, it is checked whether there is a registration list of the registered image processing devices 200 (S100).

If the registration list exists, the management server 100 accesses a plurality of image processing devices 200 via a network based on access information registered in the registration list (S110). Here, examples of the access information required for access via a network may include an IP address, a MAC address, and device identification information.

If the registration list does not exist, the management server 100 checks whether it is a manual mode for accessing the image processing device 200 based on access information manually input by an operator (S120). That is, it is checked whether access information is input by an operator or not.

The management server 100 accesses the image processing device 200 based on access information input by an operator (S130). The management server 100 registers the image processing device 200 and access information which are input in the manual mode.

The management server 100 checks whether a registration request message is received from the image processing device 200 via a network (S140). If the registration request message is received, the management server 100 access the corresponding image processing device 200 by extracting access information of the image processing device 200 from the registration request message (S150).

Meanwhile, when an automatic search is requested by an operator (S160), the management server 100 searches for the image processing device 200 which is accessible via a network and then accesses the searched image processing device 200 (S170). At this time, the management server 100 transmits an automatic search message via a network using a broadcasting method, extracts access information from an access request message received from the image processing device 200 which has received the automatic search message, and accesses the image processing device 200.

Figure 8:
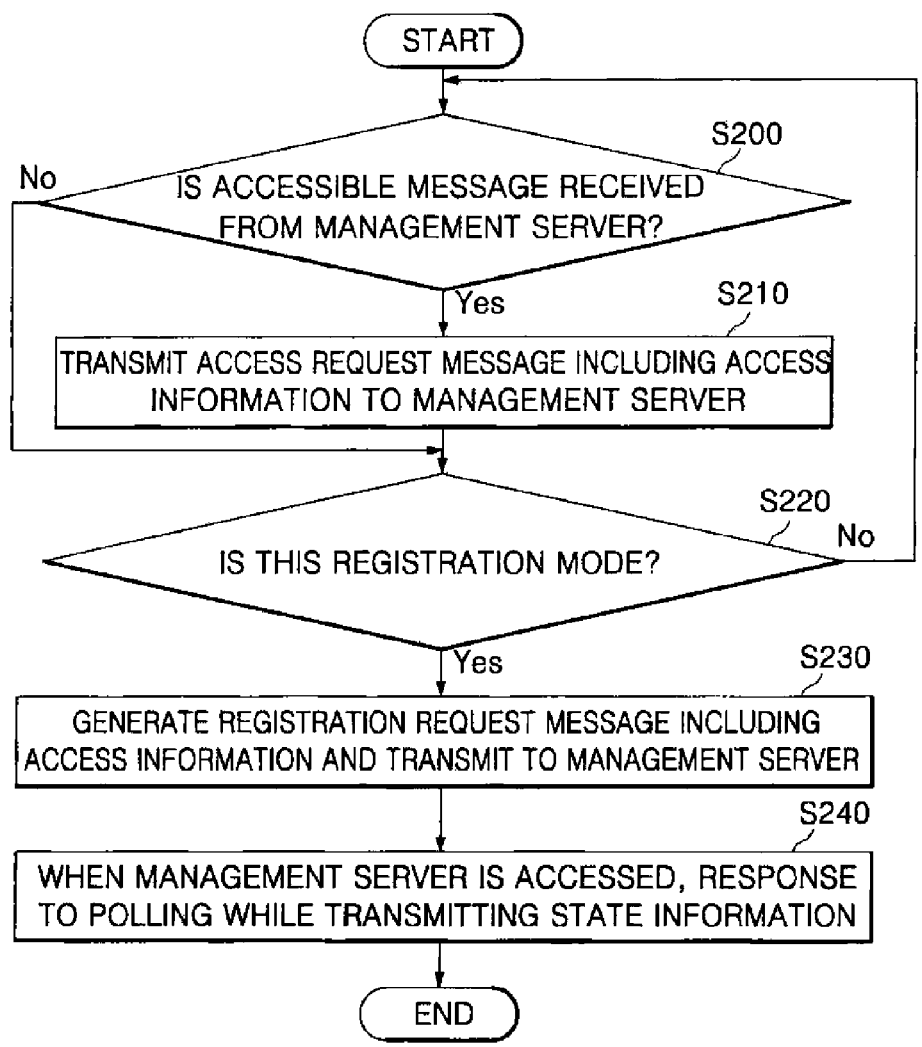
FIG. 8 is a flowchart illustrating a method in which an image processing device accesses a management server according to an exemplary embodiment of the present invention.

FIG. 8 is a flowchart illustrating a procedure in which the image processing device accesses the management server according to an exemplary embodiment of the present invention.

Referring to FIG. 8, when the image processing device 200 is started, it checks whether the accessible message is received from the management server 100 via a network (S200).

If the accessible message is received, the image processing device 200 automatically generates an access request message including access information and transmits the access request message to the management server 100 (S210). The management server 100 extracts access information from the accessible message to access the corresponding image processing device 200.

Meanwhile, the image processing device 200 checks whether a registration mode for registering to the management server 100 is set or not (S220). The registration mode can be set when an operator desires to monitor state information of the corresponding image processing device 200, and can be preferably set using access information of the management server 100.

If the registration mode is set, the image processing device 200 automatically generates the access request message including access information and transmits the access request message to the management server 100 (S230). The management server 100 accesses the corresponding image processing device 200 by extracting access information from the access request message.

When it has access to the management server 100, the image processing device 200 responds to polling while transmitting state information (S240).

Figure 9:
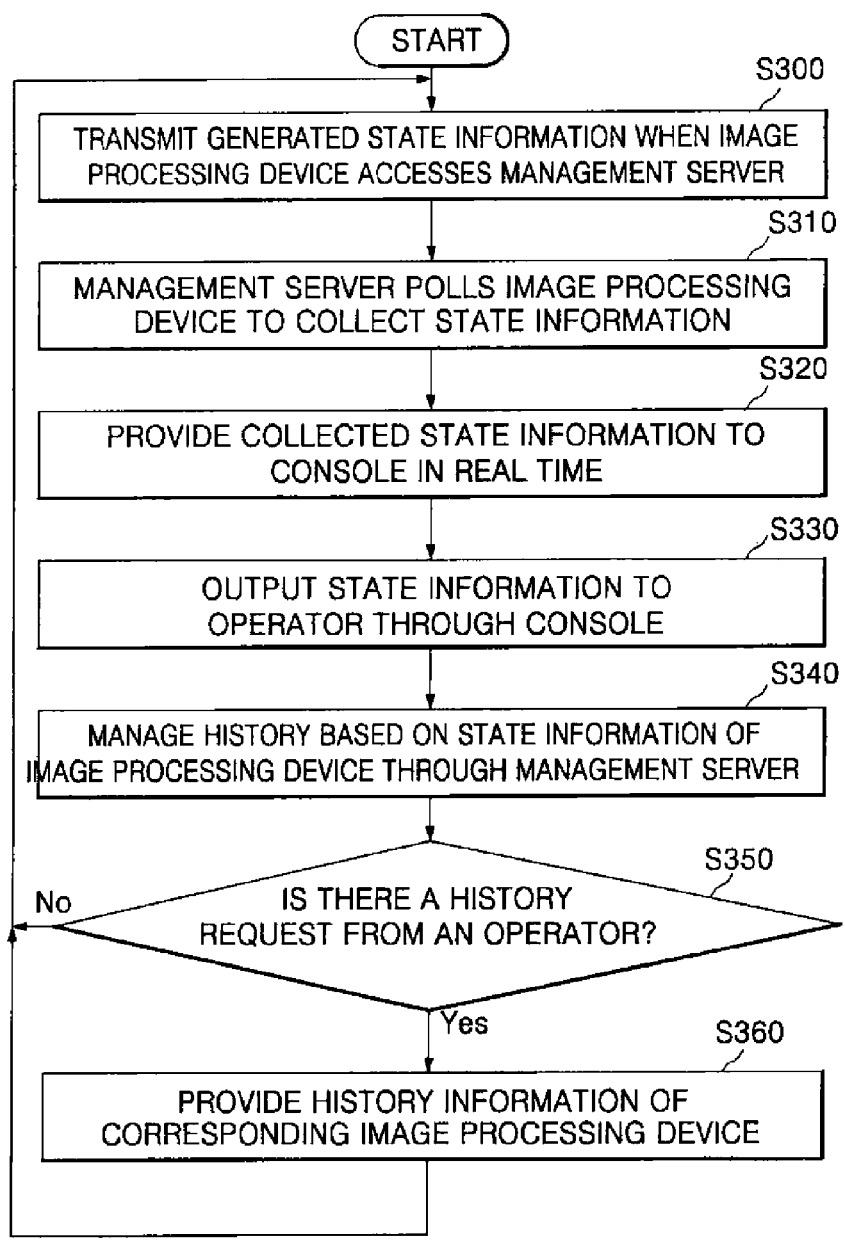
FIG. 9 is a flowchart illustrating a method for remote management of image processing devices according to an exemplary embodiment of the present invention.

FIG. 9 is a flowchart illustrating a method for remote management of image processing devices according to an exemplary embodiment of the present invention.

Referring to FIG. 9, when it has access to the management server 100 via a network, the image processing device 200 transmits state information generated by a power state transition or driving of a processor or software (S300). At this time, state information which the image processing device 200 detects by itself and transmits to the management server 100 can include power-on information, power-off information, reboot information, data loss information, storage state error information, storage failure information, and processor error information.

The management server 100 periodically polls the image processing device 200 to collect state information (S310). At this time, the management server 100 collects state information such as device error information, software error information, and network connection error information from a response to periodic polling.

If state information is received from the image processing device 200, the management server 100 provides state information to the console processing device 300 in real time (S320). At this time, the management server 100 can transmit state information to an operator's mobile phone number using a text message and can e-mail state information using e-mail address information.

The console 300 outputs state information provided from the management server 100 so that an operator can recognize an error state occurring in the image processing device 200 (S330).

The management server 100 manages history information based on state information stored in the database 130 according to identification information of the image processing device 200, type of state information, occurrence time, and group of the image processing device 200 (S340).

If an operator requests history through the console 300 (S350), the management server 100 provides history information of the corresponding image processing device 200 (S360).

At this time, the management server 100 can search for state information stored in the database 130 matching the request (for example, matching a requested type of state information) and provide the search results to the console 300 of an operator, and can manage and provide statistical information about history information and state information in the form of a history file.

According to the present invention, error information that can cause malfunction, error information generated by abnormal operation, and an operation state of each of a plurality of image processing devices respectively installed in different areas, can be collected and managed. Also, since each image processing device can detect its own operation state or state information according to a power state transition and transmit the results to a management server which can collect state information of image processing devices based on polling, state information such as image processing device internal operation state information, image processing device malfunction, network connection failure, and software error can be collected and managed.

Moreover, according to the present invention, history based on state information of each image processing device is statistically processed and provided to an operator so that the operator can identify and readily manage errors or defects in image processing devices in advance, and error information and an operation state can be reported not only to an operator managing image processing devices or a user using image processing devices through a console, but also to an operator/user who has left his/her seat, through mobile phone text messaging (for example, Short Message Service (SMS)) or e-mail in real time It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for remote management of image processing devices, the system comprising:
 a plurality of image processing devices which each detect their own first state information according to a power state transition or an operation state, provide the first state information via a network, and respond to polling;
 a management server which manages the first state information provided from each image processing device and second state information obtained from a polling response, and manages a history of each image processing device based on the first state information and the second state information, and
 a plurality of consoles which each output state information in the form of a pop-up window or a warning sound,
 wherein the management server provides the first state information provided from each image processing device to each console in real time and provides the second state information to each console when the second state information is obtained, and transmits the first state information on a text message and the second state information to a mobile phone number or a designed e-mail address.

2. The remote management system of claim 1, wherein the first state information includes at least one of power-on information, power-off information or reboot information according to a power state transition, image data loss information, image data storage state error information or storage failure information, and operating processor error information.

3. The remote management system of claim 1, wherein the second state information includes at least one of device error information of each image processing device, software error information and network connection failure information.

4. The remote management system of claim 1, wherein each image processing device transmits the first state information using a TCP/UDP-based socket communication method.

5. The remote management system of claim 1, wherein each image processing device comprises:
 a power manager which manages a power state of the image processing device and provides power-on information, power-off information or reboot information according to the power state transition;
 an image acquisition unit which acquires an image and provides an image signal;
 a data storage which stores image data corresponding to the image signal;
 a data processor which digitally processes the image signal provided from the image acquisition unit, detects data loss and a storage state while storing the image data in the data storage, and provides image data loss information or storage state error information; and
 a state detector which detects a data storing state of the data storage and transmits storage failure information to the management server, detects an operation state of a processor and transmits processor error information to the management server, provides the information provided from the power manager and the data processor to the management server, and transmits a response to polling of the management server and software error information obtained by polling each processor to the management server.

6. The remote management system of claim 5, wherein the state detector detects a storage failure state when the amount of data stored in the data storage does not increase for a predetermined time or when the size of a file storing image data does not increase for a predetermined time.

7. The remote management system of claim 5, wherein the state detector polls each processor operating software and transmits the software error information when a processor responds with abnormal information or there is no polling response.

8. The remote management system of claim 5, wherein the state detector detects a processor error when operation of a processor included in a processor list of the image processing device is stopped.

9. The remote management system of claim 5, wherein the image processing device generates a thread when the state information is generated or polling is performed.

10. The remote management system of claim 1, wherein the management server comprises:
 a state information processor which receives the first state information from the image processor and obtains the second state information from a polling response;
 a database which stores the first state information and the second state information of each image processing device;
 a state information provider which transmits the first state information and the second state information received from the state information processor to a console in real time or transmits the first state information and the second state information using a text message or an e-mail; and
 a history manager which manages history information based on the first and second state information of each image processing device stored in the database.

11. The remote management system of claim 10, wherein the state information processor comprises:
 a state information receiver which receives the first state information from each image processor and transmits the first state information through the state information provider in real time; and
 a polling processor which obtains the second state information which is one of device error information, software error information or network connection failure information based on the polling response.

12. The remote management system of claim 10, wherein the history manager manages the history information according to identification information of the image processing device, type of state information, occurrence time or group, and searches for and provides history information according to an operator's request.

13. An image processing device which acquires and stores an image, the device comprising:
 a power manager which supplies an operating voltage to the image processing device and provides power-on information, power-off information or reboot information according to a power state transition;

an image acquisition unit which acquires an image and provides an image signal;

a data storage which is realized by a hard disk drive (HDD) and stores image data corresponding to the image signal;

a data processor which digitally processes the image signal provided from the image acquisition unit and provides image data loss information or storage state error information when data loss or a storage error occurs in processing the image signal; and a state manager which generates storage failure state information when the amount of data stored in the data storage does not increase for a predetermined time, polls each processor operating software and generates software error information when a processor responds with abnormal information or there is no polling response, generates processor error information when a processor's operation is stopped, and transmits the information provided from the data processor and the power manager and the generated information to a management server.

14. A method for remote management of image processing devices, comprising at a management server, accessing and registering a plurality of image processing devices via a network;

at each image processing device, transmitting first state information, detected by the image processing device, to the management server;

at the management server, generating second state information based on a response to periodic polling;

at the management server, providing the first state information and the second state information to an operator console in real time;

at the console, outputting the first state information and the second state information; and at the management server, managing history information based on the first state information and the second state information, wherein transmitting the detected first state information to the management server comprises:

generating power-on information, power-off information or reboot information according a power state transition of each image processing device;

detecting a storage failure state when the amount of stored data does not increase for a predetermined time or the size of a file storing image data does not increase for a predetermined time and generating storage failure state information;

polling each processor operating software and generating software error information when a processor responds with abnormal information or there is no polling response; and detecting a processor error when operation of a processor included in a processor list of the image processing device is stopped and generating processor error state information.

15. The remote management method of claim 14, wherein generating the second state information comprises:

periodically polling the image processing device, and when there is no polling response, determining malfunction of the image processing device, an operation error or network connection failure and generating device error information, network connection failure information or software error information.

16. The remote management method of claim 14, wherein providing the first state information and the second state information to an operator console in real time comprises;

transmitting the first state information and the second state information to the operator console or transmitting the first state information and the second state information using a text message based on a set mobile phone number or an e-mail.

17. The remote management method of claim 14, wherein managing the history information comprises:

managing the first and second state information according to identification information of an image processing device, type of state information, occurrence time, and group; and when there is a request from an operator, searching for history information matching the request or statistically processing and providing history information.

18. The remote management method of claim 14, wherein at a management server, the accessing and registering a plurality of image processing devices via a network comprises:

when there is a registration list of registered image processing devices, accessing a corresponding image processing device based on registered access information;

when there is access information manually input by an operator, accessing an image processing device based on corresponding access information;

when a registration request message is received from an image processing device via a network, accessing a corresponding image processing device by extracting access information from the registration request message; and when an automatic search is requested by an operator, accessing a corresponding image processing device by extracting access information from an access request message received after broadcasting an accessible message via a network.

19. The remote management method of claim 14, wherein at a management server, the accessing and registering a plurality of image processing devices via a network comprises:

when the image processing device operates to receive an accessible message, automatically generating an access request message including access information and transmitting the access request message to the management server; and when the image processing device is set to a registration mode, automatically generating an access request message including access information of the image processing device based on access information of a set management and transmitting the access request message to the management server.

* * * * *